United States Patent [19]

Wakamatsu et al.

[11] 3,885,472
[45] May 27, 1975

[54] ELECTRICAL CONTROL SYSTEM FOR AUTOMATIC VEHICLE TRANSMISSION

[75] Inventors: Hisato Wakamatsu, Toyota; Hiroshi Fujinami, Kariya; Toshihiro Kamiya, Toyota, all of Japan

[73] Assignee: Nippon Soken, Inc., Nishio-shi, Japan

[22] Filed: June 15, 1973

[21] Appl. No.: 370,528

[30] Foreign Application Priority Data
June 21, 1972 Japan .................... 47-62648

[52] U.S. Cl. ................................. 74/866
[51] Int. Cl. .............................. B60k 21/00
[58] Field of Search .................. 74/866, 877

[56] References Cited
UNITED STATES PATENTS

| | | | |
|---|---|---|---|
| 3,439,564 | 4/1969 | Scholl et al. | 74/866 |
| 3,448,640 | 6/1969 | Nelson | 74/866 |
| 3,621,735 | 11/1971 | Lemieux | 74/866 X |
| 3,657,667 | 4/1972 | Nishikubo | 310/25 |
| 3,727,488 | 4/1973 | Wakamatsu et al. | 74/866 |
| 3,732,755 | 5/1973 | Beig et al. | 74/866 |
| 3,738,182 | 6/1973 | Kubo et al. | 74/866 |
| 3,750,495 | 8/1973 | Ito et al. | 74/866 |
| 3,795,831 | 3/1974 | Fujita | 310/25 X |

*Primary Examiner*—Samuel Scott
*Assistant Examiner*—John Reep
*Attorney, Agent, or Firm*—Cushman, Darby & Cushman

[57] ABSTRACT

An electrical control system is provided for automatic vehicle transmissions wherein the speed changing operation of a vehicle driving system is effected in response to the energization or deenergization of the solenoid coils of gear shifting solenoid valves. The electrical control system includes an operating section comprising an MOS large scale integrated circuit which performs necessary logical operations on digital signals corresponding to the vehicle speed and throttle valve position and digital signals indicative of the selected shift condition and driving condition whereby the solenoid coils are energized by the shift control signals produced from the operating section. Thus, the electrical control system is extremely compact as a whole and inexpensive to manufacture.

17 Claims, 12 Drawing Figures

ELECTRICAL CONTROL SYSTEM FOR AUTOMATIC VEHICLE TRANSMISSION

BACKGROUND OF THE INVENTION

1. Field of the Invention

The present invention relates to improvements in an electrical control system of the type used in automatic transmissions for vehicles, particularly automotive vehicles.

2. Description of the Prior Art

Electrical control systems for establishing the electrical shift points in automatic transmissions used on automotive vehicles conventionally employ, as a vehicle speed, the output voltage of a DC generator responsive to the wheel rotating driving system and the degree of depression of an accelerator pedal operated by the driver is converted into a DC voltage quantity by the combination of a multiple-contact switch and resistors, whereby the two analog signals are compared by means of electromagnetic relays so that shift signals are produced through the energization or deenergization of the electromagnetic relays.

Drawbacks of electrical control systems of this type include, in addition to the following errors, a large power consumption, an increased management cost required for the mass production of the systems, a large number of portions which require adjustments and hence later checks or inspections, and so on:

1. As regards the stability of the input shaft revolutions and the output voltage of a DC generator providing the required vehicle speed, there are variations in the resistance value and permeability of the windings and magnetic materials due to temperature, and a fairly wide variation in the air gaps of the magnetic circuits due to the manufacturing techniques and variations in the output voltage due to the wear of the commutators and brushes.

2. As regards the stability of the accelerator pedal position signals, there are problems such as the variations in the output voltage caused by the different temperature coefficients of the resistors and the effect of the stability of power supply voltage on the output voltage.

3. As regards the stability of the electromagnetic relays for detecting the shift points, there are problems such as the variations in the detected voltage due to the different temperature coefficients of the relay coils and the variations in the detected voltage due to the wear of the contact portions caused by the extended use thereof.

SUMMARY OF THE INVENTION

It is the object of the present invention to overcome these deficiencies. According to the present invention, there is thus provided an electrical control system for an automatic vehicle transmission comprising an operating section which performs a necessary logical operation on a digital speed signal corresponding to the vehicle speed, a digital throttle signal corresponding to the position of a throttle position, a digital signal indicating a selected shift condition and a digital signal indicating a selected driving condition to produce a shift control signal, and a power amplifier stage responsive to the shift control signal to selectively energize solenoid coils, wherein the operating section comprises an MOS large scale integrated circuit, whereby the power requirement is reduced and the simplification of the circuit construction and the rationalization of the wiring design are accomplished.

A novel feature of the improved system of the present invention is that the large scale integration of digital logical circuits which operate with greater accuracy and reliability is accomplished, that the vehicle speed and the throttle position are represented in the form of digital signals and therefore these signals are stable with the variations in the temperature and the power supply voltage, and that the number of the elements used is reduced with a considerable simplification of the circuit construction as compared with the case where the circuitry is composed of separate unit elements, thereby making the system as a whole considerably compact and inexpensive.

Another novel feature of the control system according to the present invention is that since the oscillator circuit which generates the required timing signals for logical operations in the operating section comprises a piezoelectric type vibrating device, the precision of this vibrating device is much greater than that of the control system and therefore there is no need to check the frequency of the oscillator circuit thereby greatly contributing toward the simplification of the manufacturing steps.

Still another novel feature of the control system according to the present invention is that since the required selection for producing shift signals from digital vehicle speed signals and digital throttle signals is provided by means of a matrix logical circuit connection which may be provided in the form of a so-called read-only memory (ROM), if the shift conditions are changed for different kinds of vehicles or as a result of the model change of the vehicle, the control system can be readily adapted for such change by changing the read-only memory.

Still another novel feature of the control system according to the present invention is that since the operating section is adapted to preferentially perform a logical operation on the operating conditions designated by an urgency signal, the automatic transmission can be maintained in a given condition upon occurrence of any phenomena external to the operating section, thereby ensuring a greater safety.

Still another novel feature of the control system according to the present invention is that since the operating section is of the current supply type to the power amplifier stage to which the output of the operating section, i.e., the shift control signals are passed, if a fault, e.g., a breaking of wire occurs in the interconnection of the operating section and the power amplifier stage, the shift solenoid valves may be prevented from operating erroneously.

DESCRIPTION OF THE PREFERRED EMBODIMENT

Figure 1:
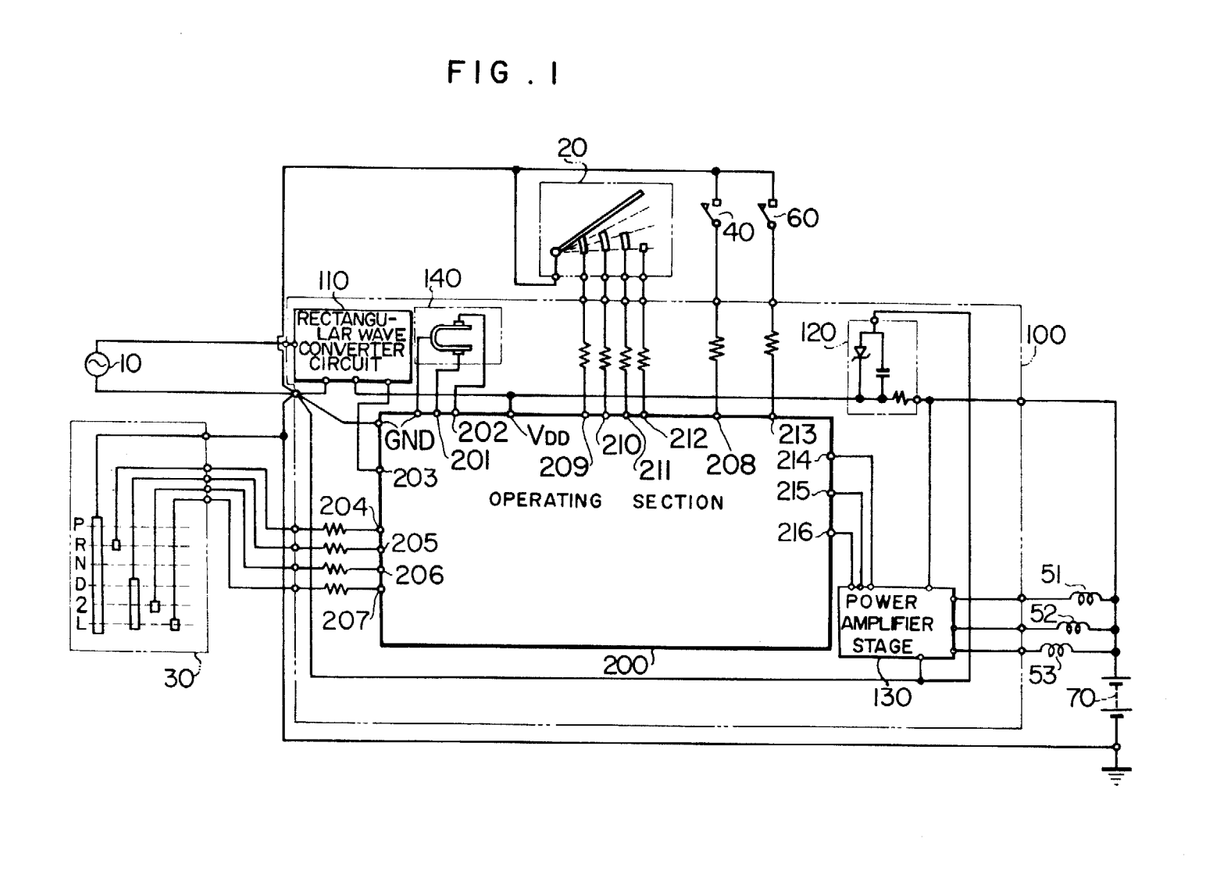
FIG. 1 is a block diagram of an electrical control system according to a preferred embodiment of the present invention.

Referring first to FIG. 1 illustrating the block diagram of the electrical control system of the present invention which is used in an electrically operated automatic automobile transmission, numeral 100 designates a control circuit with its associated peripheral devices in which numeral 10 designates an electromagnetic vehicle speed detecting generator responsive to the rotation of the wheel to generate an AC voltage, 20 a throttle switch responsive to the movement of an accelerator pedal to generate a digital throttle signal, the throttle switch being constructed so that its four signal terminals are opened when the throttle valve linked to the accelerator pedal is fully closed, while the four signal terminals are all closed when the throttle valve is fully opened. Numeral 30 designates a group of switches which provide a choice of various driving conditions, with terminals P, R, N, D, 2 and L terminals arranged so that the terminal R, for example, is grounded when the reverse is selected. Numeral 40 designates a selector switch for providing a choice of shift conditions, which provides the functions so that when the driver opens the switch 40, the upshifting or downshifting of the gears is effected in the D range selected for low driving speeds under city traffic conditions, whereas when the driver closes the switch 40, the upshifting or downshifting of the gears is produced in the S range selected for high driving speeds under sporty traffic conditions. Numerals 51 and 52 designate a first and second coil for gear shifting solenoid valves, which are energized to produce shifts according to the program sets forth in the following table. In this embodiment, the neutral and reverse ranges are mechanically provided:

| Gear | Solenoid coil | 51 | 52 |
|---|---|---|---|
| D | 1st gear | ON | ON |
|  | 2nd gear | OFF | ON |
| range | 3rd gear | OFF | OFF |
|  | Neutral | OFF | OFF |
|  | R range | OFF | OFF |

Numeral 53 designates a third coil of a solenoid valve which functions to relieve a shock transmitted to the vehicle body during a gear shifting operation. Numeral 60 designates a control switch which directs the operating conditions of the solenoid in case of emergency so that the coil current to the solenoid valve is determined with a top priority upon the closing of the switch 60.

In the illustrated embodiment, all the component parts are of the current interrupting type. Numeral 70 designates a power supply for the vehicle.

Figure 2:
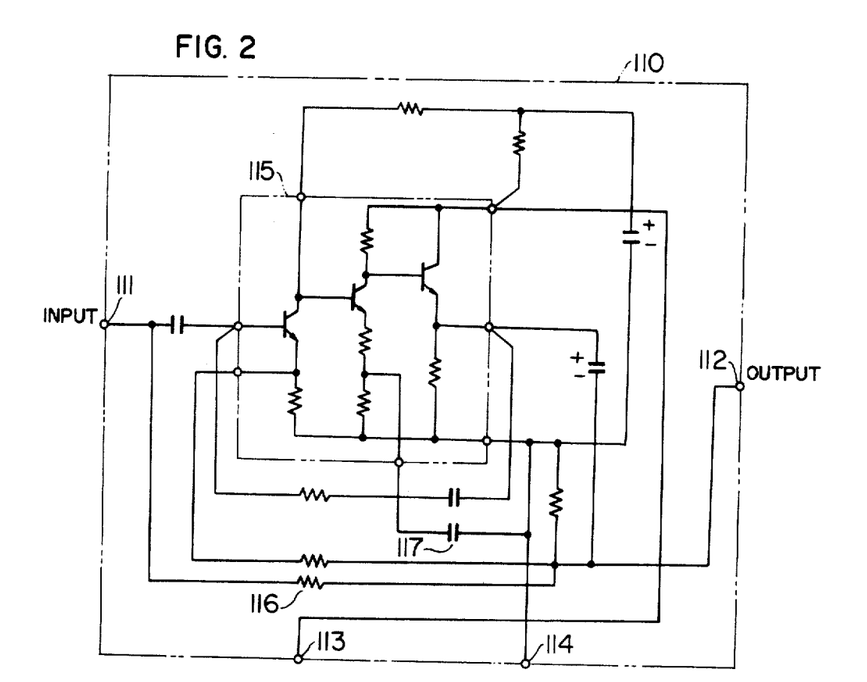
FIG. 2 is an electrical wiring diagram showing the special amplifier converter circuit employed in the control system shown in FIG. 1.
Figure 3:
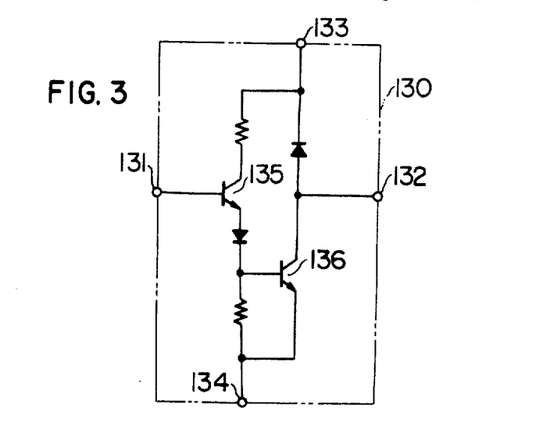
FIG. 3 is an electrical wiring diagram of the power amplifier stage employed in the control system shown in FIG. 1.

The detailed construction of the control circuit 100 will now be explained. Numeral 110 designates a special amplifier converter circuit for converting the AC output voltage of the vehicle speed detecting generator 10 into a rectangular voltage and its detailed circuit diagram is shown in FIG. 2. In this FIG. 2, numeral 111 designates an input terminal, 112 an output terminal, 113 and 114 power supply terminals, 115 a linear integrated circuit (IC), the blocking oscillation frequency being determined by the values of a resistor 116 and a capacitor 117, whereby when the vehicle is substantially at a standstill so that the input signal at the input terminal 111 which produces the AC voltage of the generator 10 becomes almost zero, the circuit 110 is caused to establish blocking oscillations thereby producing a converted rectangular output at the output terminal 112. The output frequency of the special amplifier converter circuit 110 is selected so that the output frequency of 20 Hz corresponds to the vehicle speed of 1 Km/h. Since the range of controlled vehicle speed is between 5 to 100 Km/h and the converted output frequency changes within the range between 100 and 2,000 Hz, the blocking oscillation frequency at a vehicle speed which is lower than 5 Km/h and almost at a rest, is selected by the values of the resistor 116 and the capacitor 117 to be about 20 Hz which is lower than the converted frequency of 100 Hz corresponding to the vehicle speed of 5 Km/h. Numeral 120 designates a voltage regulator circuit for stabilizing the operation of the control circuit 100, which is of the known type employing the most simple Zener diode 120a. Numeral 130 designates a transistorized two-stage amplification type power amplifier stage comprising three identical power amplifying units one of which is shown in the detailed circuit diagram of FIG. 3. In FIG. 3, numeral 131 designates an input terminal, 132 an output terminal, 134 a power supply terminal, whereby a signal applied to the input terminal 131 is subjected to two-stage amplification by two transistors 135 and 136, and a current that flows in from the output terminal 132 is blocked or conducted.

Referring again to FIG. 1, numeral 140 designates a piezoelectric type vibrating device which serves as a time standard for the entire control system and which is associated with a field-effect transistor to establish oscillations. This field-effect transistor is one of the components of an operating section 200 which will be described later. The operating section 200 comprises a large scale integrated circuit (hereinafter referred to as a LSI) and the field-effect transistor is integrally formed with other component elements. Further, ten resistors connected in series with the lines for introducing the respective signals from the throttle switch 20, the switch group 30 which provides a choice of driving conditions, the selector switch 40 and the control switch 60 into the operating section 200 comprising a LSI, are provided to protect the LSI from the external fields. The operating section 200 produces the predetermined output signals from the said input signals and supplies them to the power amplifier stage 130 and it is composed of digital circuitry provided by a single chip MOSLSI.

Figure 4:
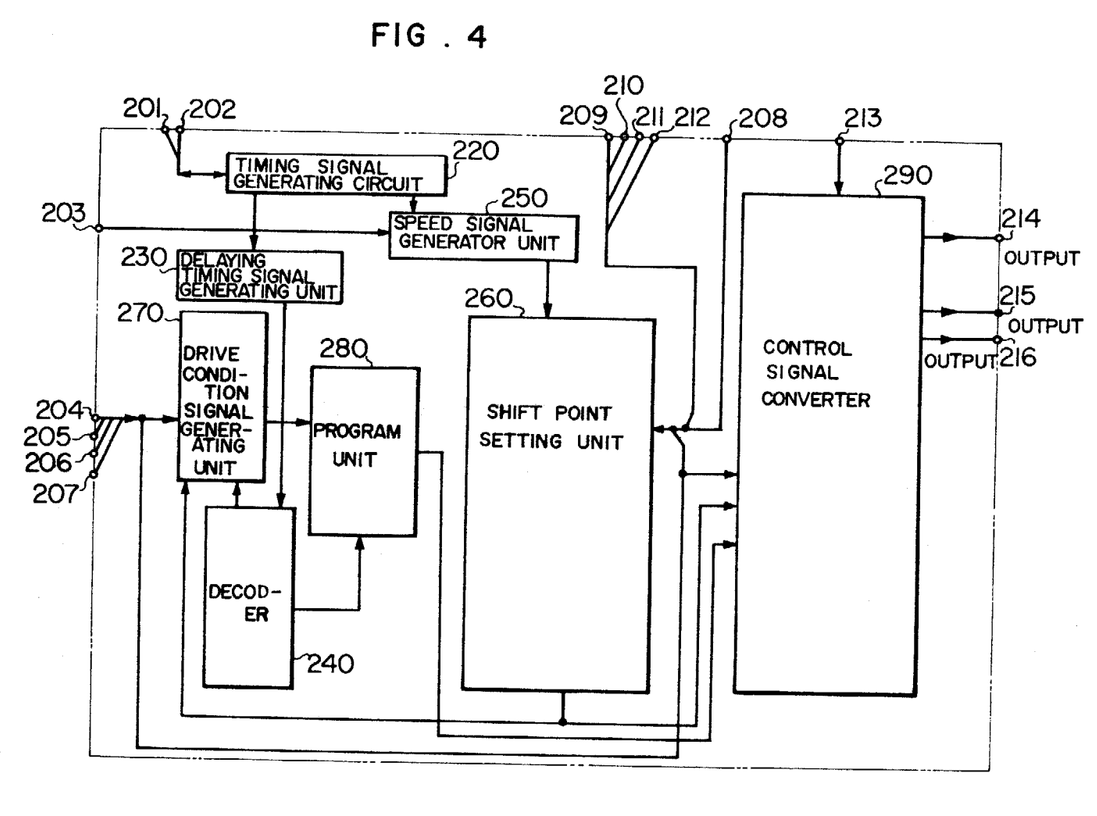
FIG. 4 is a block diagram of the operating unit employed in the control system shown in FIG. 1.
Figure 5:
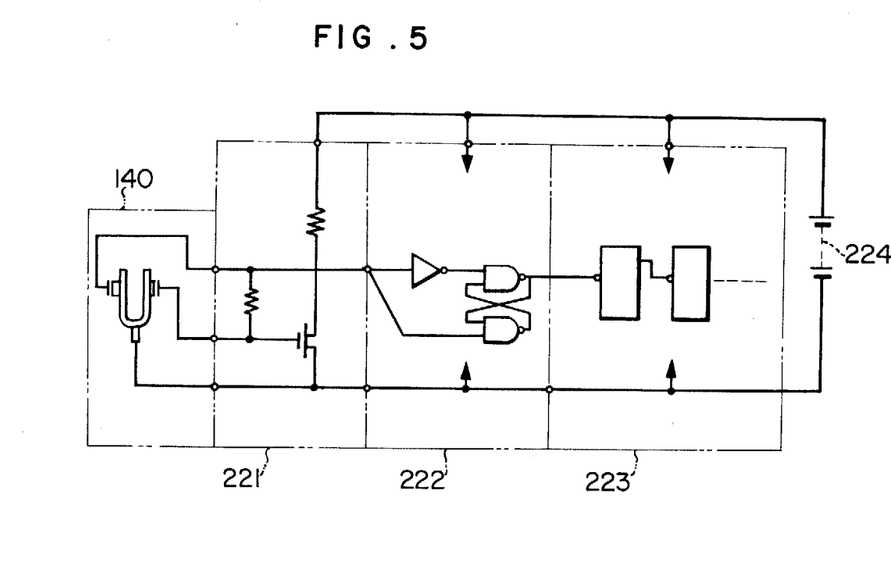
FIG. 5 is an electrical wiring diagram showing the combination of the vibrating device and the timing signal generating unit in the operating section of the control system shown in FIG. 1.

In the block diagram of the operating section 200 shown in FIG. 4, numerals 201 and 202 designate connecting terminals of the vibrating device 140, 203 an input terminal for receiving the output signal of the special amplifier converter circuit 110 which constitutes the vehicle speed signal, 204, 205, 206, 207 and 208 input terminals for receiving driving condition setting signals with the input terminal 204 receiving the reverse signal, the input terminal 205 receiving the forward signal, the input terminal 206 receiving the signal for inhibiting a shift to the third gear, the input terminal 207 receiving the signal for inhibiting a shift to the second gear, and the input terminal 208 receiving the selected shift condition signal. Numerals 209, 210, 211 and 212 designate input terminals for receiving signals from the throttle switch 20, 213 an input terminal for receiving the urgency signal from the control switch 60. 214, 215 and 216 output terminals. Numeral 220 designates a timing signal generating unit which functions, along with the vibrating device 140 connected to the input terminals 201 and 202, to generate reference timing signals. In the detailed circuit diagram of the timing signal generating unit 220 shown in FIG. 5, numeral 221 designates an oscillator circuit comprising a field effect transistor whose oscillation frequency is determined by the vibrating device 140 and this oscillation frequency is set to 960 Hz in this embodiment. The output of this oscillator circuit is converted into a rectangular wave by a reshaping circuit 222 comprising a known RS flip-flop and the produced rectangular wave is applied to a frequency dividing circuit 223 comprising a known binary counter which generates timing signals at 120 Hz and 3.75 Hz and the power supply comprises a DC power supply 224. Numeral 230 designates a delaying timing signal generating unit which receives the 120-Hz timing signals from the timing signal generating unit 220 to generate at its output delaying timing signals in the 4-bit binary code. Numeral 240 designates a decoder which converts the delaying timing signals into time delay signals of sixteen kinds. Numeral 250 designates a speed signal generating unit which receives the 3.75-Hz timing signals from the timing signal generating unit 220 and the detected vehicle speed signals applied to the input terminal 203 to produce at its output speed signals which provide digital vehicle speed signals of 32 kinds. Numeral 260 designates a shift point setting unit which receives the speed signal, i.e., the output of the speed signal generating unit 250, the shift condition signal from the input terminal 208, the throttle signal from the four input terminals 209, 210, 211 or 212, and a portion of the driving condition selecting signals from the input terminals 204, 205, 206 and 207 to produce a shift signal at its output. Numeral 270 designates a driving condition signal generating unit which receives a portion of the driving condition selection signals from the input terminals 204, 205, 206 and 207, the shift signal or the output of the shift point setting unit 260 and the timing signal or the output of the decoder 240 to produce a driving condition signal at its output. Numeral 280 designates a program unit which programs the time delay signals from the decoder 240 to produce time delay program signals for relieving gear shifting shock. Numeral 290 designates a control signal converting unit which receives the shift signals or the output of the shift point setting unit 260, the time delay program signals or the output of the programming unit 280, the urgency signal from the input terminal 213 and the driving condition selection signals from the input terminals 204, 205, 206 and 207 and produces from these four kinds of signals the required shift control signals for effecting desired shifts.

Figure 6A:
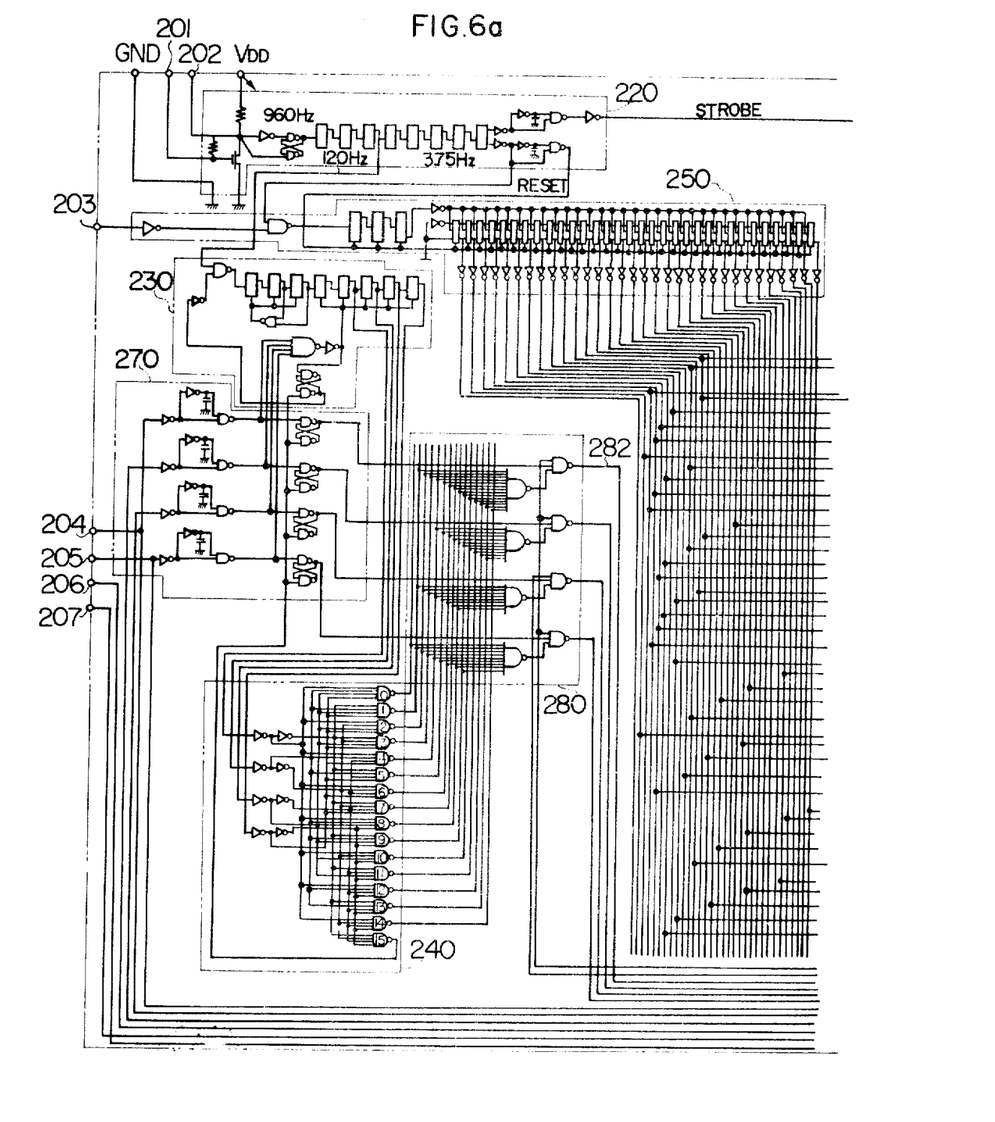
FIGS. 6a and 6b illustrate an electrical wiring diagram showing the detailed circuitry of the operating section in FIG. 5.
Figure 6B:
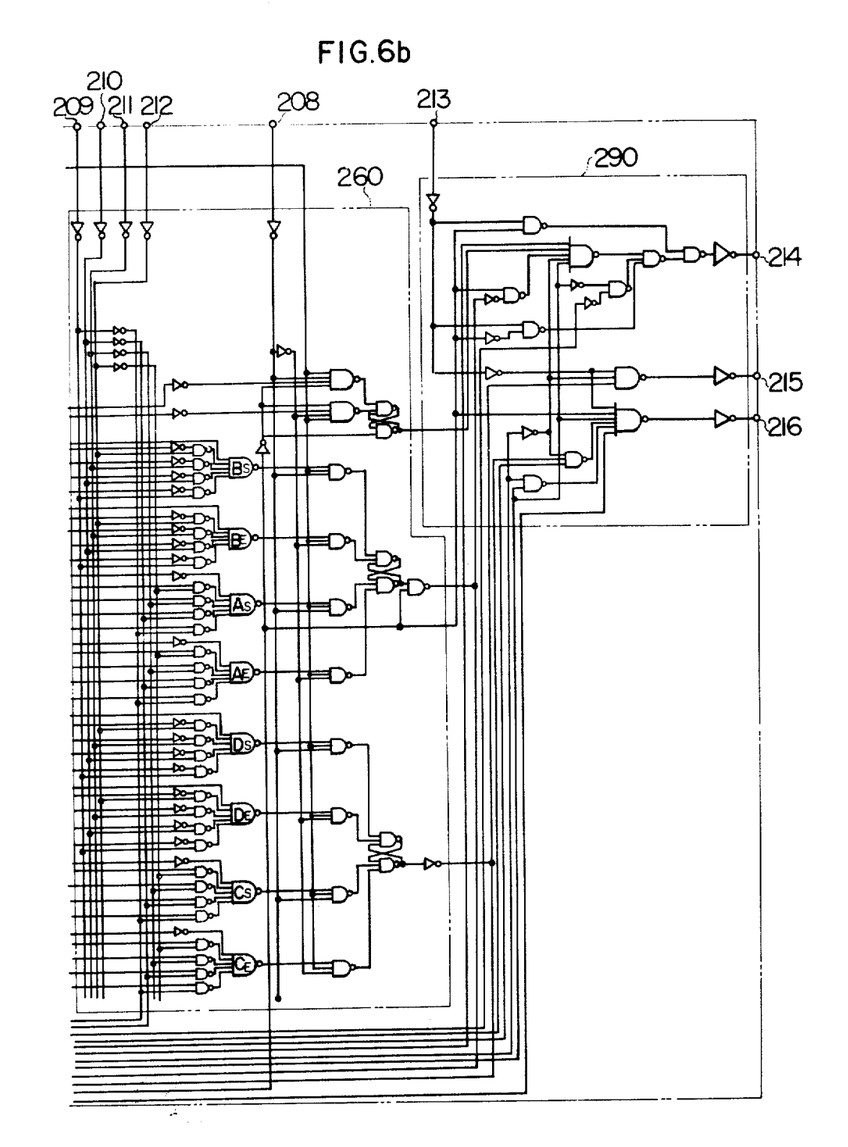

The operation of the operating section 200 will now be described with reference to FIGS. 6a and 6b illustrating a detailed circuit diagram of the operating section 200. As previously described, the timing signal generating unit 220 generates the 120-Hz and 3.75-Hz timing signals. In the speed signal generating unit 250 which receives as its inputs the 3.75-Hz timing signals and the detected vehicle speed signals from the input terminal 203, the NAND operation is performed on the two signals by a NAND gate and thereafter speed signals of 32 kinds are produced at the rate of one for every 3 Km/h of the vehicle speed by a counter comprising three flip-flops and a shift register comprising 32 flip-flops and shifted once for every 8 cycles of the detected vehicle speed signals. The resetting of the speed signal generating unit 250 is effected by the delayed 3.75-Hz timing signals from the timing signal generating unit 220 during the period of several microseconds immediately following the time when the 3.75-Hz timing signals change from the "0" level to the "1" level, whereby all the outputs of the shift register are changed to the 0 level. Then, the stable condition of the shift register is changed in proportion to the number of the cycles of the detected vehicle speed signals applied to the speed signal generating unit 250 during the 1 level of the 3.75-Hz timing signals, so that the application of 24 cycles of the detected vehicle speed signals, for example, causes only three of the flip-flops in the shift register to change their state. In this way, the speed signals of 32 kinds are supplied to the shift point setting unit 260. In addition to the speed signals of 32 kinds, the throttle signals from the four input terminals 209, 210, 211 and 212 are applied to the shift point setting unit 260 to thereby separately establish 1 − 2 and 2 − 3 upshift points and 3 − 2 and 2 − 1 downshift points. At the same time, the use is made of a memory circuit employing a flip-flop to provide a hysteresis operation for the up and down points of the shift points.

Figure 7:
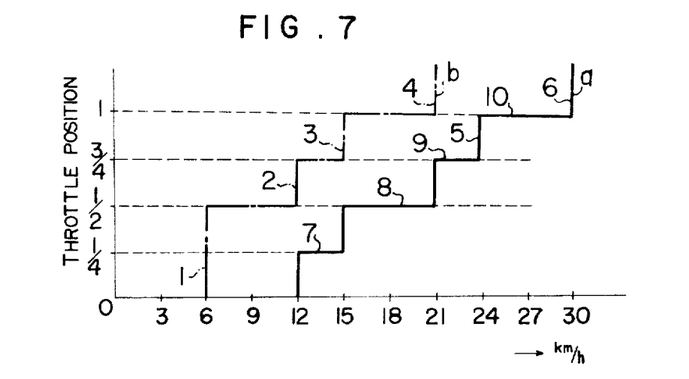
FIG. 7 is a shift diagram showing an example of the shift lines employed in the control system of the present invention.
Figure 8:
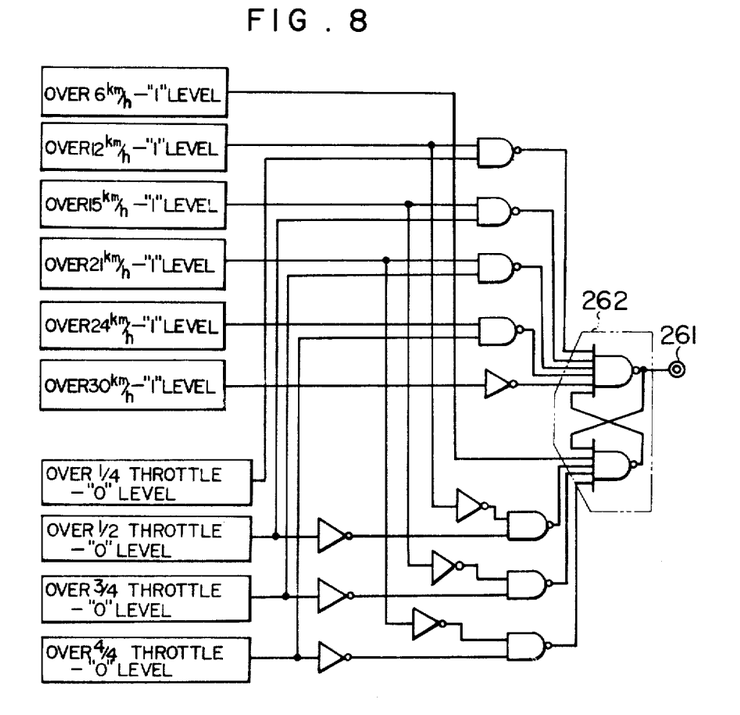
FIG. 8 is a diagram showing the basic construction of the hysteresis logical circuit employed in the operating section shown in FIGS. 6a and 6b.

These upshift points and the downshift points are shown in the shift pattern diagram of FIG. 7, in which symbol a designates the upshift line that forms the boundary between the low speed gear region and the high speed region. Consequently, once the high speed gear region has been attained, the upshift shift line a stops its function and instead only the high speed downshift shift line b is allowed to function. FIG. 8 illustrates the basic construction of the hysteresis logical circuit which provides the required hysteresis operation. This hysteresis operation will be explained referring to FIG. 8. When the vehicle speed is higher than 30 Km/h, the output terminal 261 assumes the 1 level independently of the throttle position thereby producing a shift signal for desired upshift, whereas when the vehicle speed is lower than 30 Km/h, the signal is supplied to a flip-flop memory circuit 262 through the associated AND gate thereby producing a shift signal that suits the existing conditions. However, when the vehicle speed is lower than 6 Km/h, the output terminal 261 assumes the 0 level independently of the throttle position thereby producing a desired downshift shift signal.

In the illustrated embodiment, the shift lines $a$ and $b$ shown in FIG. 7 include a total of ten shift lines, i.e., under normal shifting conditions there are five points, i.e., a 1 – 2 upshift shift line from the first to second gear, 2 – 3 upshift shift line from the second to third gear, 3 – 2 downshift shift line from the third to second gear, 2 – 1 downshift shift line from the second to first gear and a 2 – 1 downshift shift line from the second to first gear in the L-range for the engine braking on steep descents. In addition, the shift condition selection signal at the input terminal 208 provides a choice between the two lines, i.e., the S-range for the high speed region and the D-range for the low speed region. Since the shifting conditions for all of these shift lines are determined in accordance with the relationships between the throttle signals from the input terminals 209, 210, 211 and 212 and the speed signals or the output of the speed signal generating unit 250, if the logical circuit connections of the shift point setting unit 260 take the form of a matrix so that the unit can be readily provided as an ROM, any change in the shifting conditions required for different kinds of vehicles or by a model change of the vehicle may be readily accomplished.

The basic shift signals generated in the hysteresis logical circuit shown in FIG. 8 are discriminated by the driving condition selection signals as shown in FIGS. 6a and 6b, and the shift signals or the output of the shift point setting unit 260 are supplied through the three flip-flops constituting memory circuits to be solenoid actuation control signal converter 290 for L-range shift, 1 – 2 shift and 2 – 3 shift solenoids. At the same time, the shift signals for the 1 – 2 and 2 – 3 shifts are applied to the inputs of the driving condition signal generating unit 270 as the time delay system signals.

Figure 9:
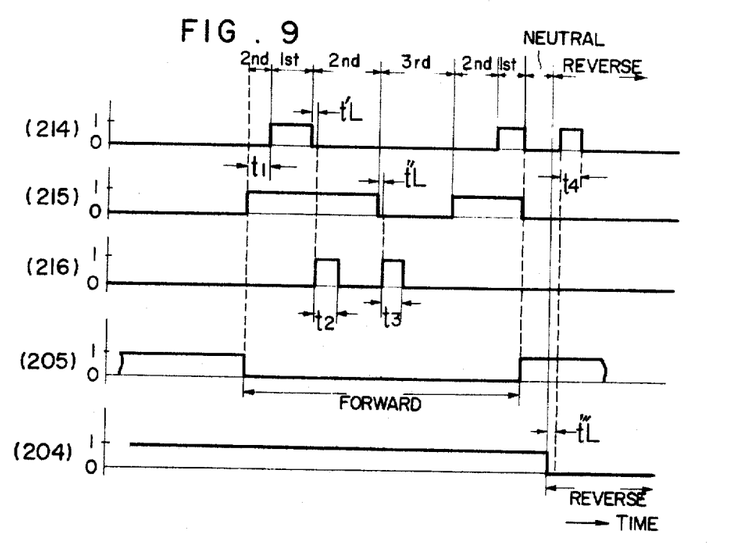
FIG. 9 is a flow chart for the driving condition control signals and the shift control signals in the operating section shown in FIG. 6.

The operation of this driving condition signal generating unit 270 will be described with reference to FIG. 9 showing the relationships between the reverse signal and the forward signal applied to the driving condition signal generating unit 270 from the input terminals 204 and 205 and the output signals at the output terminals 214, 215 and 216. As shown by (205) in FIG. 9, in the forward the forward signal at the input terminal 205 changes from 1 to 0 and, during this reversal of the forward signal, the signal at the output terminal 215 shown by (215) in FIG. 9 changes from 0 to 1 and, after a predetermined time $t_1$, the signal at the output terminal 214 changes from 0 to 1 as shown by (214) in FIG. 9. Then, during the upshift from the first to second gear the signal at the output terminal 214 changes from 1 to 0 and, after the expiration of a predetermined time $t'L$, a pulse which remains in the 1 state for a time width $t_2$ is produced at the output terminal 216 as shown by (216) in FIG. 9. Similarly, during the upshift from the second to third gear the signal at the output terminal 215 changes from 1 to 0 and, after the expiration of a predetermined time $t''L$, a pulse which remains in the 1 state for a time width $t_3$ is produced at the output terminal 216 as shown by (216) in FIG. 9. On the other hand, in the reverse the reverse signal at the input terminal 204 changes from 1 to 0 as shown by (204) in FIG. 9 and, after the expiration of a predetermined time $t'''L$, a pulse which remains in the 1 state for a time width $t_4$ is produced at the output terminal 214 as shown by (214) in FIG. 9. It will thus be seen that the shift delaying times $t_1$, $t_2$, $t_3$, $t_4$, $t'L$, $t''L$ and $t'''L$ are generated for the purpose of relieving the shock transmitted to the vehicle during the shifts and these shift delaying times are readily changeably designed since these times differ for different types of vehicles or a model change of the vehicle may require a change in these times. The generation of these signals will be described in detail hereunder.

The required time delay program signals for generating the above-mentioned pulses are provided by the four blocks including the delaying timing signal generating unit 230, the decoder 240, the driving condition signal generating unit 270 and the program unit 280. The pulses which constitute these time delaying conditions are designed so that more than two of these pulses will never be generated at a time, thereby sharing the same time source. The delaying timing signal generating unit 230 receives the 120-Hz timing signal from the timing signal generating unit 220 and divides it by a factor of 6 to produce a 20-Hz signal through a 1 : 6 frequency divider comprising three flip-flops and a single NAND gate. This divided signal is then divided by a factor of 4 to produce a 5-Hz signal through a counter comprising two flip-flops and thereafter it is supplied to a counter comprising three flip-flops to produce a 4-bit binary code delaying timing signal. This signal is then supplied to the decoder 240 so that the 4-bit binary code signals are converted into time delay signals of 16 kinds. Of the 16 time delay signals generated at the 16 output terminals, the signals at the 15 output terminals are applied to the program unit 280. On the other hand, the driving condition signal generating unit 270 is adapted to receive the reverse signal and the forward signal from the input terminals 204 and 205, respectively, and the 1 – 2 and 2 – 3 shift signals from the shift point setting unit 260, whereby its four pulse signal generating circuits produce pulses indicating a kind of driving condition and thereafter four memory circuits to which is applied the signal at the remaining one output terminal of the decoder 240, produce a driving condition signal. The driving condition signal is applied to the program unit 280 where the timing signals applied from the decoder 240 are programmed to produce time delay program signals which determine the delay times. The logical circuit connections of the program unit 280 are also arranged in a matrix form so that the unit can be readily provided as an ROM. Thus, if any change of the delay times is required for different kinds of vehicles or by a model change of the vehicle, such a change can be easily accomplished.

Figure 10:
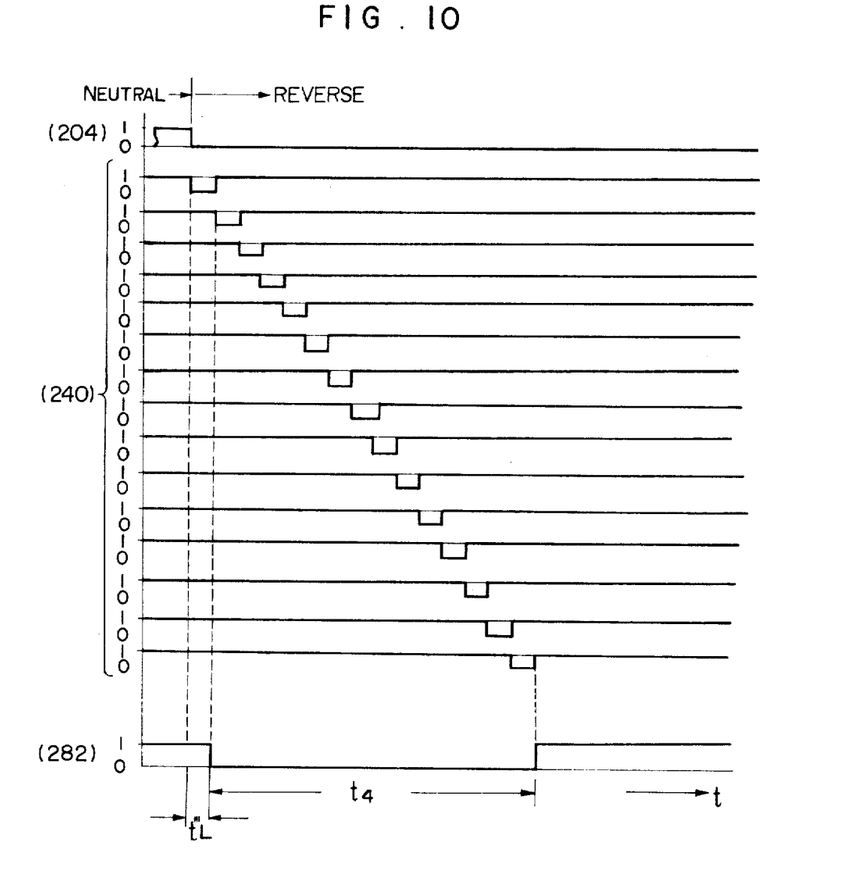
FIG. 10 is a waveform diagram showing the timing signals in the operating section shown in FIGS. 6a and 6b.

The waveforms of the various time delay signals generated at various points in the circuits are shown in FIG. 10. The waveform shown in by (204) FIG. 10 indicates the signal applied to the input terminal 204 and the change from the 1 level to the 0 indicates the time of arrival of the signal indicating the reverse. The 15 waveforms shown by (240) in FIG. 10 indicate the time delay signals or the outputs of the decoder 240 which are successively generated following the arrival of the reverse signal at the input terminal 204 and these time delay signals are then applied to the program unit 280 so that the time delay program signal shown by (282) in FIG. 10 is produced at the output of the program unit 282 according to its program. In this case, the program unit 282 is programmed so that the 2nd to 15th output time delay signals from the decoder 240 are picked up. The unit time width of the time delay signals is selected to be 0.1 second. The outputs or the time delay program signals of four kinds thus produced from the program unit 282 are introduced into the solenoid actuation control signal converter 290 which is adapted also to receive the shift signals or output of the shift point setting unit 260, the urgency signal from the input terminal 213 and the driving condition selection signals from the input terminals 206 and 207, whereby the required shift control signals are produced from these four signals and delivered to the output terminals 214, 215 and 216. The converter 290 will not be described in any greater detail, since it can be readily constructed by the ordinary logical techniques once its specification is determined.

The function of the urgency signal will now be explained. When, for example, an anti-skid system for preventing skidding of wheels during the braking of a vehicle is employed along with the electrical control system for automatic vehicle transmission according to the present invention, the urgency signal is applied to the input terminal 213 upon the initiation of the anti-skid operation to thereby lock the transmission in the top gear. In this way any irregularity of the brake system due to the automatic shifting of the transmission upon deceleration of the vehicle speed during the braking operation may be prevented to thereby ensure a positive anti-skid control operation.

Figure 11:
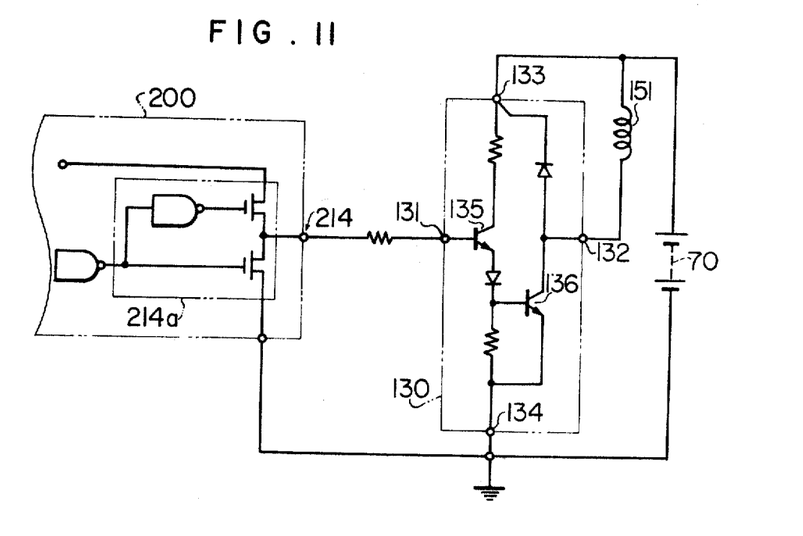
FIG. 11 is an electrical wiring diagram showing the connection circuit between the operating section and the power amplifier stage.

While, in the embodiment described above, the operating section 200 comprises the logical circuits all employing NAND gates, it is of course possible to use NOR gates in an actual unit. The output terminals 214, 215 and 216 of the operating section 200 are connected to the power amplifier stage 130 in such a manner that current is supplied to the latter. As will be seen from the detailed circuit diagram of the power amplifier stage 130 shown in FIG. 11, the solenoid 51 connected to the two-stage power amplifier stage 130 is operated according to the current supplied from the output terminal 214 which is the output of an inverter gate 214a of the operating section 200 preceding the power amplifier stage 130. Thus, even if the input terminal 214 is opened or grounded by the braking down the connecting line or the like, no current will be supplied to the solenoid 51 and no mis-operation of the solenoid 51 will occur.

Further, it has been found that by constructing the operating section 200 with a p-type MOSLSI manufactured by the ion-implantation technique, the operating section 200 could be operated with a power supply voltage of 6 volts and the consumption current of 12 mA, thereby making the operating section 200 compact and reducing its power consumption.

We claim:

1. In an automatic transmission having means for shifting the gear positions of a vehicle driving system, an electrical control system comprising:

converting means for detecting the speed of a vehicle and generating a converted signal, said converted signal having a fixed frequency when the vehicle speed is below a predetermined level and having a frequency proportional to the vehicle speed when the vehicle speed is above the predetermined level, means for setting the vehicle driving condition and for generating a digital signal corresponding to a selected driving condition, means responsive to the movement of an accelerator pedal for generating a throttle position digital signal, and logic operation means connected to receive the converted signal from said converting means and the digital signals from said driving condition setting means and said accelerator pedal responsive means for performing a logic operation and for generating a shift command signal to thereby control the operation of said shifting means.

2. An electrical control system according to claim 1, wherein said converting means comprises detection means for generating an AC signal having a frequency corresponding to the vehicle speed, and an amplifier converter circuit means connected to receive the AC signal from the detection means for generating a converted signal having a fixed frequency when the frequency of the AC signal is below a predetermined value and having a frequency proportional to the frequency of the AC signal when the frequency of the AC signal is above the predetermined value.

3. An electrical control system according to claim 1, wherein a resistor is inserted in each of the signal carrying leads connecting said driving condition setting means and said accelerator pedal responsive means to said logic operation means, to thereby protect said logic operation means from being affected by an external electric field.

4. An electrical control system according to claim 1, wherein said driving condition setting means and said accelerator pedal responsive means include switching means having a contact connected to a grounded terminal, said switching means being operable to generate a digital signal in response to the closing or opening of the contact.

5. An electrical control system according to claim 1, wherein said logic operation means is integrally constructed in a MOS integrated circuit.

6. An electrical control system according to claim 1 wherein said logic operation means comprises means responsive to the actuation of an antiskid device for giving priority to an operating condition.

7. An electrical control system according to claim 1, wherein said logic operation means supplies a control current to said shifting means when shifting is commanded.

8. In an automatic transmission having means for shifting the gear positions of a vehicle driving system, an electrical control system comprising converting means for detecting the speed of a vehicle and generating a converted signal, said converted signal having a fixed frequency when the vehicle speed is below a predetermined level and having a frequency proportional to the vehicle speed when the vehicle speed is above the predetermined level, reference signal generating means for generating a reference timing signal and a reference sampling signal produced by dividing the frequency of the reference timing signal, means for generating a digital vehicle speed signal by sampling the converted signal from said converting means on the basis of the reference sampling signal from said reference signal generating means, means for setting the vehicle driving condition and for generating a digital signal corresponding to a selected driving condition, means responsive to the movement of an accelerator pedal for generating a throttle position digital signal, shift point setting means connected to said vehicle speed generating means, said driving condition setting means and said accelerator pedal responsive means for combining the digital signals therefrom to generate a shift signal in accordance with a predetermined shift condition, means for generating a time delay signal to relieve shift shock, said time delay signal generating means being adapted to produce a frequency-divided signal by dividing the frequency of the reference timing signal from said reference signal generating means and being adapted to perform a logic operation in response to the frequency-divided signal, the digital signal from said driving condition setting means and the shift signal from said shift point setting means to thereby generate the time delay signal, and means for generating a shift command signal to control the operation of said shifting means, said shift command signal generating means being adapted to perform a logic operation dealing with the time delay signal from said delay signal generating means and the shift signal from said shift point setting means.

9. An electrical control system according to claim 8, wherein at least said vehicle speed signal generating means, said shift point setting means, said time delay signal generating means and said shift command signal generating means are integrally constructed in a MOS integrated circuit.

10. An electrical control system according to claim 8, wherein said reference timing signal generating means comprises a piezoelectric vibrating oscillator.

11. An electrical control system according to claim 8, wherein said shift point setting means comprises a read only memory.

12. An electrical control system according to claim 8, wherein said time delay signal generating means comprises a read only memory.

13. An electrical control system according to claim 8, wherein said shift point setting means comprises a circuit means responsive to the actuation of an antiskid device for giving priority to an operating condition.

14. An electrical control system according to claim 8, wherein said shift command signal generating means supplies a control current to said shifting means when shifting is commanded.

15. An electrical control system according to claim 8, wherein said converting means comprises detection means for generating an AC signal having a frequency corresponding to the vehicle speed, and an amplifier converter circuit means connected to receive the AC signal from the detection means for generating a converted signal having a fixed frequency when the frequency of the AC signal is below a predetermined value and having a frequency proportional to the frequency of the AC signal when the AC signal frequency is above the predetermined value.

16. An electrical control system according to claim 18, wherein said driving condition setting means and said accelerator pedal responsive means include switching means having a contact connected to a ground terminal, said switching means being operable to generate a digital signal in response to the closing or opening of the contact.

17. An electrical control system according to claim 9, wherein resistors are respectively inserted in each of the signal carrying leads connecting said driving condition setting means and said accelerator pedal responsive means to said MOS integrated circuit, to thereby protect said logic operation means formed in the MOS integrated circuit from being affected by an external electric field.

* * * * *